United States Patent [19]
Fall et al.

[11] Patent Number: 5,639,370
[45] Date of Patent: Jun. 17, 1997

[54] COMPOUND LAYER RESIN BONDED FILTER CARTRIDGE

[75] Inventors: Ronald E. Fall, Indianapolis; Mehrdad Jafarabadi, Brownsburg; John M. Ruddock, Westfield, all of Ind.

[73] Assignee: Parker-Hannifin Corporation, Cleveland, Ohio

[21] Appl. No.: 721,928

[22] Filed: Sep. 27, 1996

Related U.S. Application Data

[63] Continuation of Ser. No. 443,635, May 18, 1995, abandoned.

[51] Int. Cl.$^6$ ................................................. B01D 27/06
[52] U.S. Cl. ............... 210/489; 210/497.01; 210/497.1; 55/489; 55/520; 55/DIG. 5
[58] Field of Search ............... 210/232, 321.74, 210/321.83, 488, 489, 492, 497.01, 497.1, 493.4, 504; 55/489, 500, 520, 524, 527, DIG. 5

[56] References Cited

U.S. PATENT DOCUMENTS

| | | |
|---|---|---|
| 3,347,391 | 10/1967 | Steensen . |
| 3,399,516 | 9/1968 | Hough, Jr. et al. . |
| 3,450,632 | 6/1969 | Olson et al. . |
| 4,111,815 | 9/1978 | Walker et al. . |
| 4,240,864 | 12/1980 | Lin . |
| 4,629,474 | 12/1986 | Thornton . |
| 4,661,132 | 4/1987 | Thornton et al. . |
| 4,731,184 | 3/1988 | Ostreicher et al. . |
| 4,765,915 | 8/1988 | Diehl . |
| 4,814,079 | 3/1989 | Schneider .................... 210/321.83 |
| 4,826,597 | 5/1989 | Silverwater et al. ............ 210/493.4 |
| 4,882,056 | 11/1989 | Degen et al. ................... 55/520 |
| 5,039,413 | 8/1991 | Harwood et al. . |
| 5,122,270 | 6/1992 | Ruger et al. . |
| 5,230,726 | 7/1993 | Smith et al. ................... 55/520 |
| 5,252,207 | 10/1993 | Miller et al. . |
| 5,269,921 | 12/1993 | Ruger et al. . |
| 5,340,479 | 8/1994 | Szczepanski et al. . |
| 5,460,721 | 10/1995 | Goodwin ....................... 55/520 |

FOREIGN PATENT DOCUMENTS

| | | |
|---|---|---|
| 0 458 049 | 11/1991 | European Pat. Off. . |
| 92 07 015.9 | 12/1993 | Germany . |
| 6297605 | 10/1994 | Japan . |
| 2 267 656 | 12/1993 | United Kingdom . |

*Primary Examiner*—W. L. Walker
*Attorney, Agent, or Firm*—Christopher H. Hunter

[57] ABSTRACT

A hollow, cylindrical, resin-bonded filter cartridge has an inner, depth-type filter media with a graded density which decreases (becomes porous) in the radial direction from the inner surface to the outer surface. An outer strip of filter media is then wound in a spiral or helix around the inner filter media. The outer filter media is also a depth type of filter media and has uniform density and is wound with adjacent windings abutting one another such that a continuous groove or channel is provided along the length of the cartridge. The groove or channel provides a greater effective surface area on the outer surface of the filter cartridge. The outer strip of filter media preferably comprises a lengthwise-extending body panel with a pair of leaves extending along either edge of the body panel. The leaves are folded against the lower surface of the outer filter media to provide a multi-layer outer filter media structure.

47 Claims, 2 Drawing Sheets

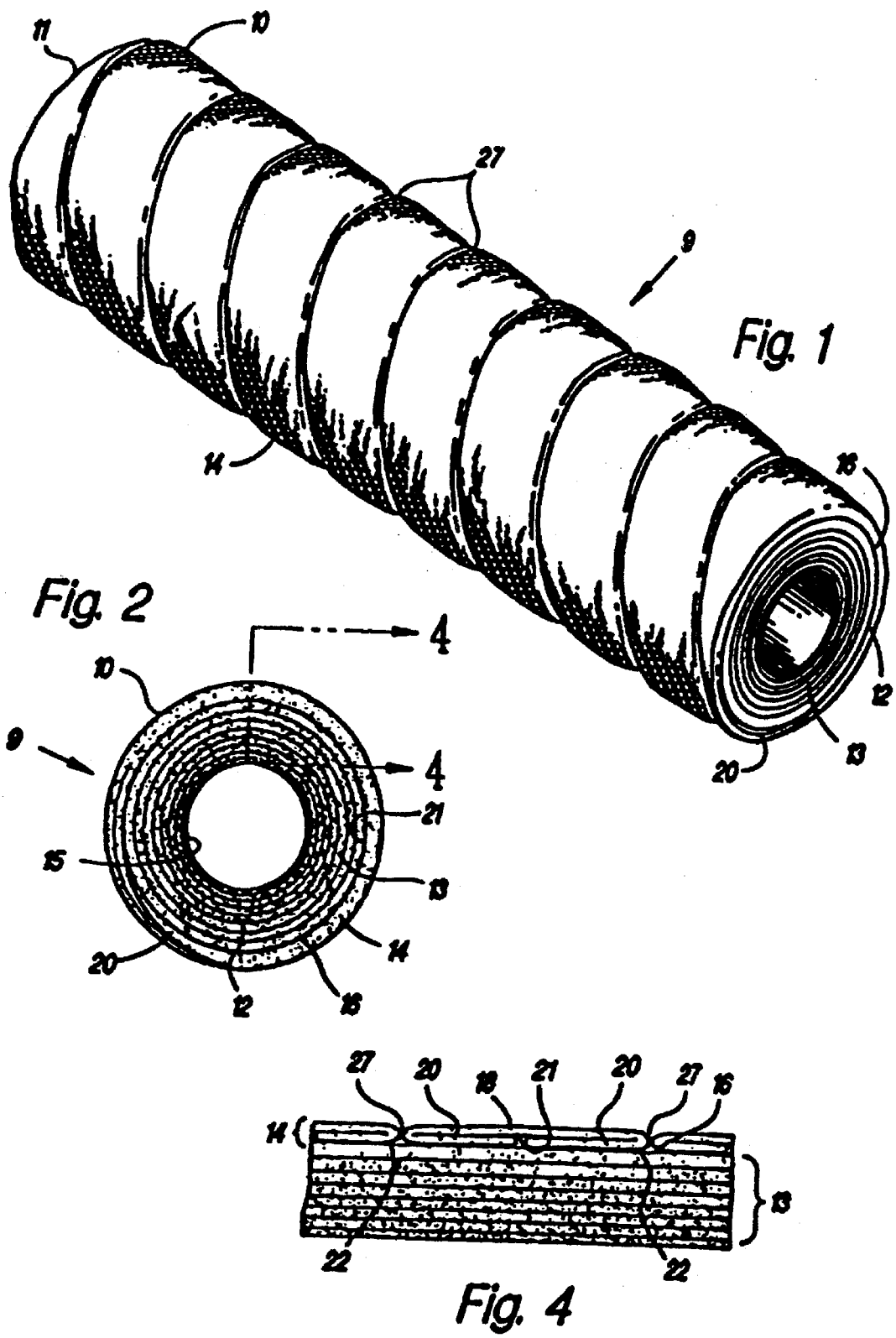

COMPOUND LAYER RESIN BONDED FILTER CARTRIDGE

This application is a continuation of application Ser. No. 08/443,635 filed on May 18, 1995, now abandoned.

FIELD OF THE INVENTION

The present invention relates generally to filter cartridges and methods for making filter cartridges.

BACKGROUND OF THE INVENTION

Filter cartridges which are porous, hollow, cylindrical, resin-bonded structures are known in the art for high temperature and/or high strength applications. Particulate matter is entrapped within the pores of the filter media in the cartridge as fluid or gas flows radially inward or radially outward through the media. Various filter media structures have been developed in an attempt to provide an efficient, low-cost and long-lasting filter cartridge. One known filter media structure has a stepped or graded density in the radial direction through the filter cartridge. The density of the filter media increases in the direction of fluid flow (radially inward or radially outward) to trap the larger particulate matter in the more porous (less dense) areas, while the smaller particulate matter is retained in the less porous (more dense) areas. Such filter cartridges are preferable to a single, high density filter cartridge because larger particulate matter contacting the surface of a high density filter may completely plug or fill the small spaces or voids in the media. Such filter media structures are shown in U.S. Pat. Nos. 5,122,270; 3,347,391; 4,661,132; 5,269,921; 3,450,632; 4,240,864; 5,340,479; 4,731,184; 4,629,474; 3,399,516; 4,111,815; and 3,347,391.

The filter media for such cartridges can be formed in many different ways, for example the media can be blown as fibers onto a spinning mandrel, or the media can be formed in a mat, such as by a needling machine. In the latter case, the mat can be wound around the mandrel in a single winding, or built-up in a number of windings. Harwood, et al., U.S. Pat. No. 5,039,413 describes a multi-layer filter cartridge wherein a mat of filter media is wound in a strip around the cartridge such that each individual winding overlaps onto an adjacent winding at least 50% of the width of the wrap. The overlapping of the windings is provided for strengthening the filter cartridge.

It is also known to increase the exposed surface area of a filter cartridge by pleating (see e.g., U.S. Pat. No. 4,731,184) or by cutting into the exterior surface of the filter media so as to form circumferential grooves (see e.g., U.S. Pat. No. 3,347,391). Increasing the exposed surface area of a filter cartridge can increase the useful life of the cartridge because the cartridge can collect and retain a larger amount of large particulate matter. The above techniques of pleating and cutting, however, can require additional manufacturing steps which can increase the overall cost of the filter cartridge, while the technique of cutting can also waste material.

It is therefore believed that there is a demand in the industry for an efficient, low-cost and long-lasting filter cartridge which i) does not require additional manufacturing steps such as cutting or pleating to increase the exposed surface area of the cartridge, and ii) does not waste material during manufacture.

SUMMARY OF THE INVENTION

The present invention provides a novel and unique structure for an efficient, low-cost and long-lasting filter cartridge, and a method for making the filter cartridge.

The filter cartridge includes an inner, depth-type tubular filter media preferably formed from needled mat material. The inner filter media is impregnated with a resin for strength and is wound around a mandrel in a plurality of windings to an appropriate diameter. The wound mat of inner filter media has a density which decreases (becomes more porous) in the radial direction from the inner surface to the outer surface. The density of the inner filter media can be controlled by compression rollers as the inner filter media is being wound around the mandrel. A polyester wire or string can be wound around the inner filter media to retain the inner filter media on the mandrel.

An outer filter media is then disposed around the inner filter media. The outer filter media is preferably a depth-type, needled-fibrous mat material in strip or ribbon form. The outer strip of filter media preferably has a uniform density which is significantly less (more porous) than the inner filter media such that the outer filter media acts as a pre-filter. The outer filter media is also preferably formed with a lengthwise-extending body panel and a pair of leaves extending along either edge of the panel. The leaves are folded against the lower (inner) surface of the outer filter media to provide a multi-layer outer filter media structure.

The outer filter media is spirally or helically wrapped around the inner filter media. The outer filter media is preferably wrapped in a single layer around the inner filter media such that the edges of adjacent windings abut each other. A continuous groove or channel is provided between the adjacent windings of the outer filter media because of the multi-layered structure of the outer filter media. The groove or channel provides a greater effective surface area for particle entrapment along the length of the filter cartridge. The ends of outer layer of filter media can be secured to the inner filter media in an appropriate manner, for example with an adhesive.

The present invention as described above provides an efficient, low-cost and long-lasting filter cartridge which does not require additional manufacturing steps (such as pleating or cutting) to increase the exposed surface area of the cartridge, and does not waste material during manufacture.

Other features and advantages of the present invention will become further apparent upon reviewing the following description and accompanying drawings.

BRIEF DESCRIPTION OF THE DRAWINGS

FIG. 1 is a perspective view of a filter cartridge constructed according to the principles of the present invention;

FIG. 2 is an end view of the filter cartridge of FIG. 1;

FIG. 4 is a sectional view of the filter cartridge of FIG. 1 taken substantially along the plane described by the lines 4—4 of FIG. 1.

DETAILED DESCRIPTION OF THE PREFERRED EMBODIMENT

Figure 3:
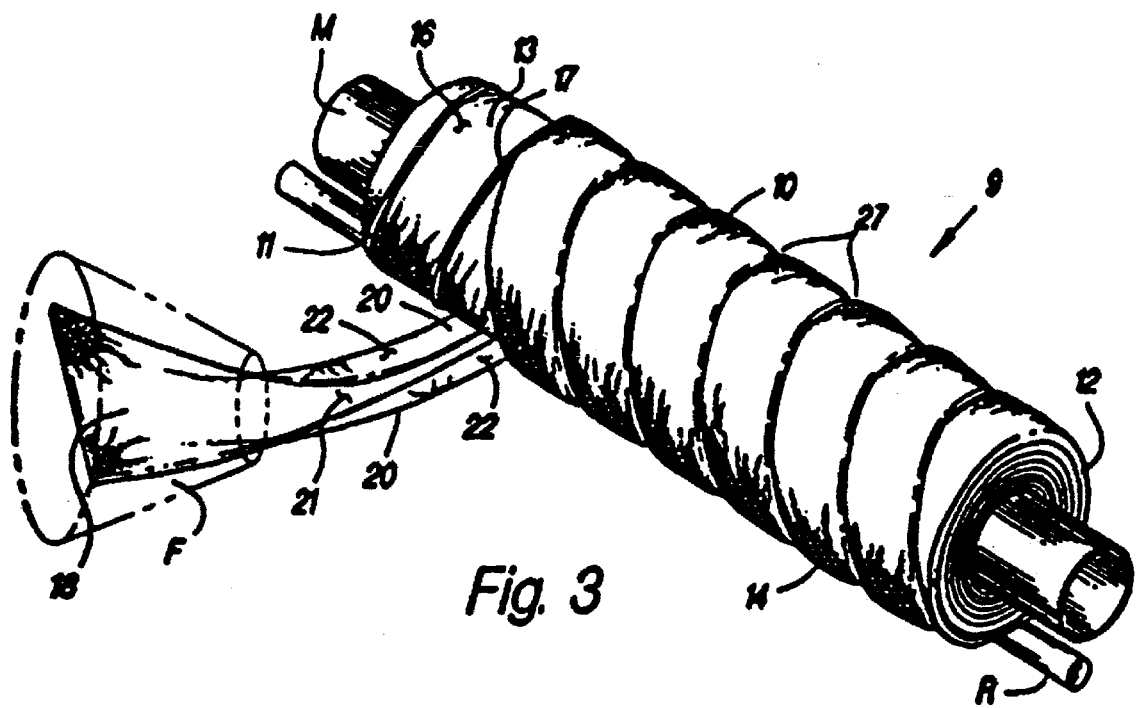
FIG. 3 is a partially assembled view of the filter cartridge of FIG. 1.

Referring to the drawings, and initially to FIGS. 1–4, a filter cartridge constructed according to the principles of the present invention is indicated generally at 9. The filter cartridge 9 has a tubular or cylindrical body 10 with opposite flat end faces 11, 12. The dimensions of the filter cartridge (inner and outer diameter, length, etc.) can vary depending upon the particular application as should be apparent to those skilled in the art upon reading the following description of the invention.

The filter cartridge 9 includes an inner filter media wrap 13 and an outer filter media wrap 14. As can best be seen in FIG. 2, the inner filter media 13 is a depth-type filter and has a graded density which varies from the inner surface 15 to the outer surface 16 of the inner filter media. Preferably, the inner filter media has a density which is greater (less porous) toward the inner surface and is less (more porous) toward the outer surface. The density of the inner filter media preferably varies in a uniform manner radially outward from the inner surface to the outer surface, although the variation in density can be tailored for the particular application (e.g., the density can be stepped, exponential, etc.).

The inner filter media 13 is preferably formed from a conventional material. One preferred material for the inner filter media is an acrylic, however, other appropriate materials include polymers, such as polyester, polyamide, polyvinyl chloride or polyacrylonitrile; or polyolefins such as polyethylene or polypropylene. Other less preferred materials include wool, esparto, yucca, cellulose, glass, rayon or admixtures thereof. Methods for manufacturing the inner filter media material into an appropriate porous structure are also conventional and well-known to those skilled in the art. One preferred method is to form a needled-fibrous mat of material. The mat can be formed by a needling machine which weaves the fibers into a matrix.

The inner filter media is preferably impregnated with a heat-fusable resin to impart strength and rigidity to the media such that the media can withstand high temperatures and pressures, and to waterproof the fibers. The resin employed in the inner filter media is also conventional, and can be a thermosetting resin such as water-based phenol formaldehyde condensation products, urea formaldehyde condensation products, or melamine resins. Thermoplastic resins such as polystyrene may also be used. The methods for impregnating fibers with resin are also conventional and well-known to those skilled in the art. One preferred method of impregnating the inner filter media is to pass the mat through a pair of transfer rollers in a nip coater, although another appropriate method is to dip-coat the mat. The inner filter media is then located in a pre-cure oven until the inner filter media has a relatively stable form, but has a certain amount of flexibility.

The mat is then cut to an appropriate length and wound around a mandrel "M" (FIG. 3) by automated machinery into a multi-layer tubular form. Preferably, three outside compression rollers are used to direct the mat around the mandrel. The rollers vary the density in the mat and control the diameter of the inner filter media by varying the compression on the mat. As indicated previously, the rollers preferably provide a wound mat with a density which is maximum at the inner surface and decreases (becomes more porous) radially outward from the inner surface to the outer surface. The number of layers of inner filter media wound around the mandrel can vary depending upon the initial thickness of the inner filter media, the amount of compression provided by the rollers on the mat, and the desired overall diameter of the filter cartridge.

After the inner filter media is wound onto the mandrel, a string or wire 17 (e.g., a polyester or acrylic tire cord) can be wrapped around the inner filter media to hold it temporarily on the mandrel. Alternatively, adhesive can be applied along the free edges of the inner filter media to hold the inner filter media together.

The outer filter media wrap 14 is then disposed around the inner filter media 13. The outer filter media can also be formed of the same depth-type, needled-fibrous mat material as the inner filter media, and can be resin impregnated in the same manner as described previously. Preferably the density (porosity) of the outer filter media is uniform and is significantly less (more porous) than the density of the inner filter media. As an example, the density of the inner filter media might vary from about 5 μm at the inside diameter to 75 μm at the outside diameter, while the density of the outer filter media layer might be at least 125 μm. The outer filter media thereby is designed to act as a pre-filter for the inner filter media. As with the inner filter media, the density of the outer filter media can be chosen depending upon the particular application.

The outer filter media preferably comprises a lengthwise-extending body panel 18 having a pair of leaves 20 along either edge of the body panel. The leaves 20 are folded lengthwise against the inner (lower) surface 21 of the main body panel 18 to create a strip or ribbon form. Preferably, the leaves 20 of the outer filter media are each about half the width of the main body panel 18 such that when the leaves are folded inwardly, an outer filter media structure is provided with substantially two complete layers (see e.g., FIG. 4). The leaves can be folded as the outer filter media layer is disposed around the inner filter media layer such as by feeding the outer filter media through a funnel "F" to impart a C-shaped form to the strip.

Preferably, the outer filter media 14 is wound in a helical or spiral fashion in a single layer along the length of the cartridge, as illustrated in FIG. 3. Winding equipment (e.g., funnel F) is positioned substantially perpendicular to the axis of the mandrel and traverses the length of the cartridge in a single pass. A roller "R" then compresses the strip of outer filter media as it is being applied to the inner filter media to provide a substantially flat outer filter media structure. When the outer filter media is wrapped around the inner filter media, the inwardly-directed surface 22 of the leaves 20 is in surface-to-surface contact with the outer surface 16 of the inner filter media 12. The ends of the outer filter media strip can then be secured to the inner filter media such as by a hot melt adhesive or other appropriate means.

The outer filter media is wound in such a manner that the edges of the individual windings abut each other along the length of the filter cartridges, as best shown in FIG. 4. In so doing, a thin V or U-shaped groove or channel 27 is provided between the individual windings continuously along the length of the filter cartridge at the interface locations between the windings. The groove or channel 27 is caused by the rounded edge structure of each winding formed as a result of the multi-layered outer filter media structure. The groove or channel extends part-way through the outer filter media structure. Alternatively, the outer filter media can be wound in such a manner that a space is provided between adjacent windings and the groove or channel exposes the inner filter media 12. In either case, the groove or channel provides a greater effective surface area on the exterior surface of the cartridge.

The filter cartridge is then given a final cure to set the resin in the inner and outer filter media. The final cure also causes the windings of the outer filter media (if they are abutting each other) to adhere to one another along their side edges to form a strong integral outer layer. The cartridge is then removed from the mandrel and sheared or cut to an appropriate length, if necessary, to provide the flat end surfaces.

Figure 5:
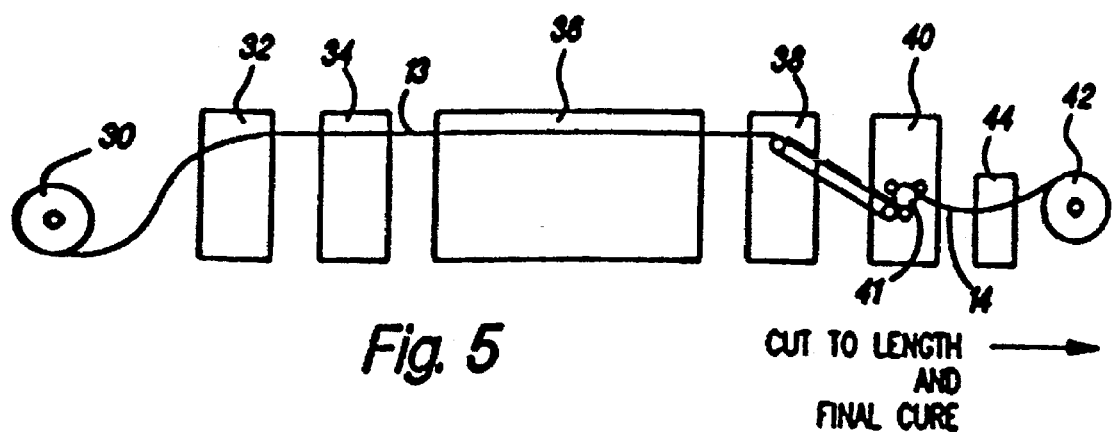
FIG. 5 is a schematic illustration of the method for manufacturing the filter cartridge of FIG. 1.

A schematic illustration of a portion of the machinery for forming the filter cartridge of the present invention is shown in FIG. 5. The inner filter media is provided in mat form on roll 30, and passed through a cutter/splicer 32 and resin-coater 34. The resin-impregnated mat is then pre-cured in oven 36 and cut to an appropriate length by cutter 38. The cut mat is then fed through a mat winder 40 and wound around a mandrel 41 to an appropriate diameter. Mat winder 40 can introduce a wire or string to hold the inner filter media on the mandrel.

After the inner filter media 13 is wound around mandrel 41, the strip of outer filter media 14 is unwound from roll 42 and fed through winding equipment 49 (e.g., the funnel) to wrap the inner filter media on the mandrel. The funnel traverses the length of the filter cartridge as it applies the spiral or helical winding of outer filter media material. The outer filter media is then cut as appropriate and attached (such as with adhesive) at its ends to the inner filter media. The filter cartridge is then removed from the mandrel, cut to an appropriate length, and given a final cure.

The filter cartridge described above provides a greater effective surface area along the outer surface of the filter cartridge by virtue of the exterior channel or groove along the windings on the cartridge. Fluid flowing through the cartridge is generally drawn to the groove or channel because of the less flow resistance in this area. As the filter media in the groove or channel becomes filled with particulate matter, the fluid begins to flow primarily through the body portion of the outer filter media. The increased surface area on the cartridge increases the service life of the cartridge and is provided without additional manufacturing steps such as pleating or cutting, and without wasting outer filter media material. Further, the outer filter media, being of a larger porous structure, traps larger particulate matter, which thereby also extends the life of the filter cartridge. The wrapping of the inner filter media with a spiral or helical layer of outer filter media further improves the strength of the filter cartridge by tightly retaining the layers of the filter cartridge. The diameter of the filter cartridge can also be carefully controlled by compression rollers such that post-grinding of the cartridge is not necessary.

The assembled filter cartridge described above can then be further integrated into a filter assembly. The structure of the filter assembly can vary depending upon the particular application, and is not described herein for sake of brevity. As should be apparent from the above, the filter cartridge of the present invention is intended to be used where the contaminated fluid or gas passes radially inward through the filter cartridge to take advantage of the porous structure of the outer pre-filtration layer, the increased filter area provided by the continuous groove or channel in the outer layer, and the varying density in the inner filter media.

Thus, described above, the present invention provides an efficient, low-cost and long-lasting filter cartridge which does not require additional manufacturing steps to increase the exposed surface area, and which does not waste material during manufacture. The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A hollow cylindrical filter cartridge, comprising:
   i) an inner wrap of depth filter media,
   ii) an outer wrap of filter media in the form of a strip surrounding the inner wrap of filter media in a plurality of spiral or helical windings along a longitudinal axis of the cartridge, said plurality of windings of said strip defining a groove or channel between adjacent windings along the exterior of the cartridge which increases the overall surface area of the filter cartridge.

2. The cartridge as in claim 1, wherein said groove or channel in said outer layer is formed without removing material from the outer wrap.

3. The cartridge as in claim 2, wherein said outer wrap of filter media is wound around the inner wrap of filter media in such a manner that the groove or channel extends continuously along the length of the cartridge.

4. The cartridge as in claim 3, wherein said outer wrap of filter media is wrapped in a single layer around the inner wrap along the length of the cartridge.

5. The cartridge as in claim 4, wherein said outer wrap of filter media is wrapped such that adjacent windings of said strip abut each other along the edges of the windings.

6. The cartridge as in claim 5, wherein said inner wrap of filter media has an inner surface and an outer surface, and said outer wrap of filter media has an inner and outer surface, and said inner surface of said outer wrap of filter media is disposed in surface-to-surface contact with said outer surface of said inner wrap of filter media around the entire circumference of the cartridge.

7. The cartridge as in claim 6, wherein said inner wrap of filter media has a density which is maximum at the inner surface and decreases to the outer surface.

8. The cartridge as in claim 7, wherein said outer wrap of filter media has a density which is less than the minimum density of the inner filter media wrap.

9. The cartridge as in claim 8 wherein said inner wrap of filter media is impregnated with a resin material.

10. A hollow cylindrical filter cartridge, comprising:
    i) an inner wrap of filter media in the form of a tube, and
    ii) an outer wrap of filter media surrounding the inner wrap of filter media, said outer wrap of filter material extending in a helical or spiral winding along the length of the inner filter media, said outer wrap of filter media having a lengthwise-extending main body panel with an integral leaf extending lengthwise along at least one edge of the main body panel, said at least one leaf being folded lengthwise against a surface of the main body panel to form a multi-layered structure.

11. The cartridge as in claim 10, wherein a first leaf extends along a first edge of the main body panel and is folded lengthwise against the surface, and a second leaf extends along a second edge of the main body panel and is also folded lengthwise against the surface.

12. The cartridge as in claim 11, wherein each of said leaves has a width which is about half the width of the main body panel.

13. The cartridge as in claim 12, wherein said outer wrap of filter material has a greater porosity than the inner wrap of filter media.

14. In a hollow cylindrical filter cartridge having:
    i) an inner wrap of depth filter media,
    ii) an outer wrap of filter media surrounding the inner wrap of filter media, the improvement comprising the outer wrap being helically or spirally wrapped along a longitudinal axis of the cylindrical filter cartridge such that a groove or channel.
    is defined between adjacent windings along the exterior surface of the cartridge for providing increased exposed surface area for the cartridge.

15. The cartridge as in claim 14, wherein the inner wrap of filter media has a radially inner surface and a radially outer surface, and the density of the inner wrap is at a maximum at the inner surface of the inner wrap of filter media and decreases radially outward to the outer surface of the inner filter media.

16. The cartridge as in claim 15, wherein said outer wrap of filter media has a uniform density, said uniform density being less than the minimum density of the inner wrap.

17. The cartridge as in claim 16, wherein said outer wrap of filter media has a radially inner surface and a radially outer surface, and said outer surface of said inner wrap is in surface-to-surface contact with said inner surface of the outer wrap around the entire circumference of the cartridge.

18. The cartridge as in claim 17, wherein said inner wrap of filter media is impregnated with a resin material.

19. The cartridge as in claim 18, wherein said outer wrap of filter media is wrapped such that adjacent windings abut each other along the edges of the windings.

20. A method for forming a hollow cylindrical filter cartridge, comprising the steps of:
   i) providing an inner wrap of depth filter media in tubular form,
   ii) wrapping a strip of an outer filter media around the inner filter media, said outer filter media being wrapped along a longitudinal axis of the cylindrical filter cartridge such that a groove or channel is provided between adjacent windings of the strip to provide increased surface area on the exterior of the filter cartridge.

21. The method as in claim 20, wherein said outer filter media is spirally or helically wrapped in a single layer around the inner filter media such that the groove or channel is provided continuously along the length of the filter cartridge.

22. The method as in claim 21, wherein said outer filter media is wrapped such that the edges of adjacent windings abut one another.

23. The method as in claim 22 wherein the inner wrap is wrapped around a mandrel and the density of the inner wrap is at a maximum along the mandrel and decreases radially outward away from the mandrel.

24. The method as in claim 23, wherein the inner wrap is compressed by rollers around the mandrel as the inner wrap is being wrapped so as to increase the porosity of the inner wrap in the radially outward direction.

25. A hollow cylindrical filter cartridge, comprising:
   i) an inner wrap of filter media,
   ii) an outer wrap of filter media in the form of a strip surrounding the inner wrap of filter media in a plurality of spiral or helical windings, said plurality of windings of said strip defining a groove or channel along the exterior surface of the cartridge which increases the overall surface area of the filter cartridge, said outer wrap of filter media having a main body panel and a pair of leaves along either edge of the main body panel, each of said pair of leaves being fold lengthwise against a surface of the main body panel such that the outer wrap is a multi-layered structure.

26. A hollow cylindrical filter cartridge having:
   i) an inner wrap of filter media,
   ii) an outer wrap of filter media surrounding the inner wrap of filter media, the improvement comprising the outer wrap being helically or spirally wrapped around the inner wrap such that a groove or channel is defined between adjacent windings along the exterior surface of the cartridge for providing increased exposed surface area for the cartridge, and wherein the outer wrap of filter media is in the form of a strip with a main body panel and a pair of leaves along either edge of the strip, each of said leaves being folded lengthwise against a surface of the main body panel to form a multi-layered structure.

27. A method for forming a hollow cylindrical filter cartridge, comprising the steps of:
   i) providing an inner wrap of filter media in tubular form,
   ii) providing an outer wrap of filter media in the form of a strip with a main body panel and a pair of leaves along either edge of the strip, folding a pair of leaves along either edge of the strip lengthwise against a surface of the strip to form a multi-layered structure, said outer filter media being wrapped such that a groove or channel is provided between adjacent windings of the strip to provide increased surface area on the exterior of the filter cartridge.

28. The cartridge as in claim 1, wherein said inner wrap of filter media has a generally constant radial distance from a central geometric axis of the filter cartridge.

29. The cartridge as in claim 28, wherein said inner wrap is non-pleated.

30. The cartridge as in claim 29, wherein said inner wrap of filter media comprises a fibrous mat material.

31. The cartridge as in claim 30, wherein said outer filter media wrap comprises a depth filter media.

32. The cartridge as in claim 31, wherein said outer filter media wrap comprises a fibrous mat material.

33. The cartridge as in claim 32, wherein said inner wrap of filter media comprises a multilayered wrap of filter media material.

34. The cartridge as in claim 1, further including a string or wire tightly surrounding said inner wrap and retaining said inner wrap in a tubular form.

35. The cartridge as in claim 6, wherein the windings of the outer wrap have rounded edges between the inner surface and the outer surface, the rounded edges between adjacent windings defining a U or V-shaped groove along the exterior of the cartridge.

36. The cartridge as in claim 14, wherein said inner wrap of filter media has a generally constant radial distance from a central geometric axis of the filter cartridge.

37. The cartridge as in claim 36, wherein said inner wrap is non-pleated.

38. The cartridge as in claim 37, wherein said inner wrap of filter media comprises a fibrous mat material.

39. The cartridge as in claim 38, wherein said inner wrap of filter media comprises a multilayered wrap of filter media material.

40. The cartridge as in claim 39, wherein said outer filter media wrap comprises a depth filter.

41. The cartridge as in claim 40, wherein said outer filter media comprises a fibrous mat material.

42. The cartridge as in claim 41, further including a string or wire tightly surrounding said inner wrap and retaining said inner wrap in a tubular form.

43. The filter cartridge as in claim 17, wherein the windings of the outer wrap have rounded edges between the inner surface and the outer surface, the rounded edges between adjacent windings defining a U or V-shaped groove along the exterior of the cartridge.

44. The method as in claim 20, further including the step of wrapping said inner filter media with a string or wire to retain said inner filter media in a tubular form.

45. The method as in claim 20, wherein said strip of outer filter media is initially provided with rounded edges such that when said strip is wrapped around the inner filter media, the rounded edges provide a U or V-shaped groove or channel along adjacent windings.

46. A hollow cylindrical filter cartridge, comprising:
   (i) an inner wrap of resin-impregnated depth filter media, said inner wrap comprising a mat wound in a circumferential winding in at least one layer, with an inner surface of said inner wrap forming the inner-most layer of the filter cartridge, and
   (ii) an outer wrap of filter media in the form of a strip surrounding the inner wrap in a plurality of spiral or helical windings along a longitudinal axis of the cartridge, said outer wrap having an inner surface disposed in surface-to-surface contact with an outer surface of said inner wrap, and said plurality of windings of said outer wrap a defining a groove or channel between abutting side edges of the strip along the exterior of the cartridge which increases the overall surface area of the filter cartridge, and wherein said outer wrap of filter media has a density which provides a pre-filter for the inner filter media wrap.

47. A method for forming a hollow cylindrical filter cartridge comprising the steps of:
(i) providing an inner, resin-impregnated wrap of depth filter media and an outer wrap of filter media, said outer wrap of filter media being more porous than said inner wrap;
(ii) wrapping the inner wrap of depth filter media around a mandrel in one or more circumferential layers such that an inner surface of the inner wrap is in surface-to-surface contact with the mandrel;
(iii) wrapping the outer filter media in spiral or helical windings around the inner filter media such that an inner surface of the outer filter media is in surface-to-surface contact with the outer surface of the inner filter media, said outer filter media being wrapped along the longitudinal axis of the cylindrical filter cartridge such that adjacent windings of the outer wrap abut each other along adjacent side edges and a groove or channel is provided between the adjacent side edges to provide increased surface area along the exterior of the filter cartridge;
(iv) setting the resin in said inner wrap to form an integral structure; and
(v) removing the cartridge from the mandrel.

* * * * *